(12) United States Patent
Yamada et al.

(10) Patent No.: US 10,225,531 B2
(45) Date of Patent: Mar. 5, 2019

(54) IMAGE DISPLAY UNIT, IMAGE PROJECTION UNIT, AND IMAGE PROJECTION APPARATUS

(71) Applicants: Masamichi Yamada, Kanagawa (JP); Yoshito Saito, Kanagawa (JP); Akihisa Mikawa, Kanagawa (JP)

(72) Inventors: Masamichi Yamada, Kanagawa (JP); Yoshito Saito, Kanagawa (JP); Akihisa Mikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/592,237

(22) Filed: May 11, 2017

(65) Prior Publication Data

US 2017/0347070 A1    Nov. 30, 2017

(30) Foreign Application Priority Data

May 26, 2016    (JP) .................................. 2016-104922

(51) Int. Cl.
*G03B 21/14* (2006.01)
*H04N 9/31* (2006.01)

(52) U.S. Cl.
CPC ........... *H04N 9/315* (2013.01); *G03B 21/145* (2013.01); *H04N 9/3102* (2013.01)

(58) Field of Classification Search
CPC .... G03B 21/14; G03B 21/145; G03B 21/142; H04N 9/31; H04N 9/3152; H04N 9/3102
See application file for complete search history.

(56) References Cited

U.S. PATENT DOCUMENTS

| 8,038,307 B2 * | 10/2011 | Kitahara ................ G03B 27/62 353/101 |
| 8,052,287 B2 * | 11/2011 | Lu .......................... G03B 21/00 248/917 |
| 8,985,788 B2 * | 3/2015 | Zhu ........................ G03B 21/00 248/121 |
| 2005/0050569 A1 | 3/2005 | Yamanaka et al. |
| 2006/0284495 A1 | 12/2006 | Seo et al. |
| 2010/0033820 A1 | 2/2010 | Omi |
| 2011/0019157 A1 | 1/2011 | He |
| 2011/0043766 A1 | 2/2011 | Itoh et al. |

(Continued)

FOREIGN PATENT DOCUMENTS

| CN | 1882065 A | 12/2006 |
| CN | 102955337 A | 3/2013 |

(Continued)

OTHER PUBLICATIONS

Combined Office Action and Search Report dated Aug. 24, 2018 in Chinese Patent Application No. 201710284845.1 with English translation of categories of cited documents, AA, AO-AP therein, 7 pages.

*Primary Examiner* — William C Dowling
(74) *Attorney, Agent, or Firm* — Oblon, McClelland, Maier & Neustadt, L.L.P.

(57) ABSTRACT

An image display unit includes a first unit fixed to a receiving frame, a second unit, movably supported by the first unit, including an image generator to generate an image when light enters the image generator, and a first link unit to supportingly fix the first unit to the receiving frame, and a space between the first unit and the receiving frame adjustable by the first link unit.

4 Claims, 17 Drawing Sheets

(56) References Cited

U.S. PATENT DOCUMENTS

| | | |
|---|---|---|
| 2014/0036239 A1 | 2/2014 | Mashitani |
| 2015/0219983 A1 | 8/2015 | Mashitani et al. |
| 2015/0264291 A1 | 9/2015 | Tani et al. |
| 2016/0154294 A1 | 6/2016 | Fujioka et al. |
| 2016/0198134 A1* | 7/2016 | Mikawa ............... H04N 9/3152 348/745 |

FOREIGN PATENT DOCUMENTS

| | | |
|---|---|---|
| JP | 2001-350196 | 12/2001 |
| JP | 2004-180011 | 6/2004 |
| JP | 2008-070494 | 3/2008 |
| JP | 2008-225158 | 9/2008 |
| JP | 2008-292647 | 12/2008 |
| JP | 2010-243686 | 10/2010 |
| JP | 2011-027821 | 2/2011 |
| JP | 2012-181386 | 9/2012 |
| JP | 2013-117629 | 6/2013 |
| JP | 2016-102945 | 6/2016 |
| JP | 2016-102946 | 6/2016 |
| WO | WO2016/067519 | 5/2016 |

* cited by examiner

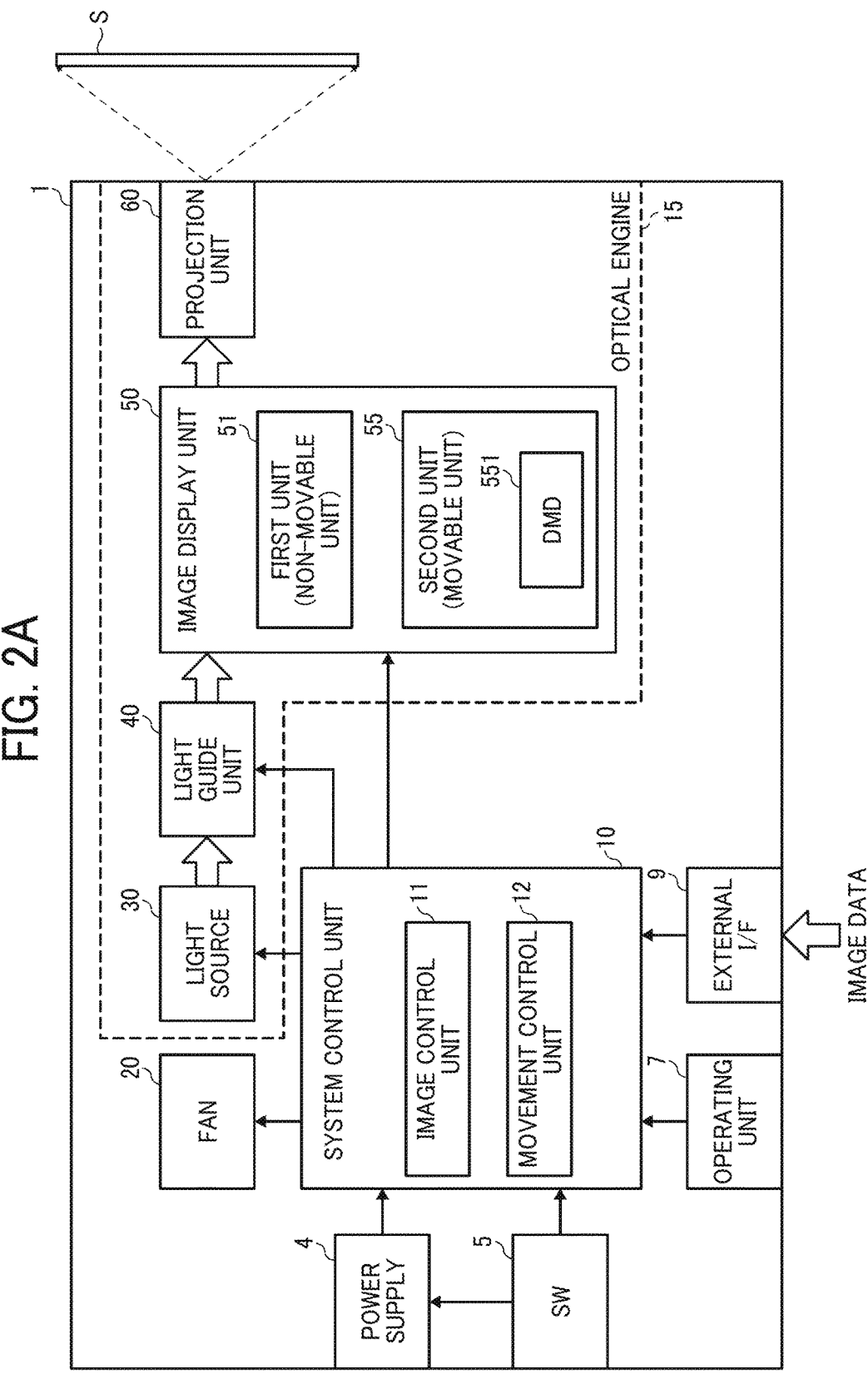

IMAGE DISPLAY UNIT, IMAGE PROJECTION UNIT, AND IMAGE PROJECTION APPARATUS

CROSS-REFERENCE TO RELATED APPLICATION

This application claims priority pursuant to 35 U.S.C. § 119(a) to Japanese Patent Application No. 2016-104922, filed on May 26, 2016 in the Japan Patent Office, the disclosure of which is incorporated by reference herein in its entirety.

BACKGROUND

Technical Field

This disclosure relates to an image display unit, an image projection unit, and an image projection apparatus.

Background Art

Image projection apparatuses that project a projection image generated by an image display element are available, in which the image display element generates the projection image based on image data input to the image projection apparatus, and the projection image is enlarged and projected on a screen.

In these image projection apparatuses, a pixel-shift device is moved to light coming from a plurality of pixels of the image display element to shift a light axis of the light coming from the plurality of pixels of the image display element (i.e., pixel-shift) to project an image having a resolution level higher than a resolution level of the image display element as disclosed, for example, in JP-2004-180011-A.

When the pixel-shift device is movably disposed, the installation position of the pixel-shift device with respect to an optical projection unit and the image display element may fluctuate greatly, with which projection image quality may deteriorate.

SUMMARY

As one aspect of present disclosure, an image display unit is devised. The image display unit includes a first unit fixed to a receiving frame, a second unit, movably supported by the first unit, including an image generator to generate an image when light enters the image generator, and a first link unit to supportingly fix the first unit to the receiving frame, and a space between the first unit and the receiving frame adjustable by the first link unit.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 2A is a hardware block diagram of the image projection apparatus of FIG. 1;

Figure 1:
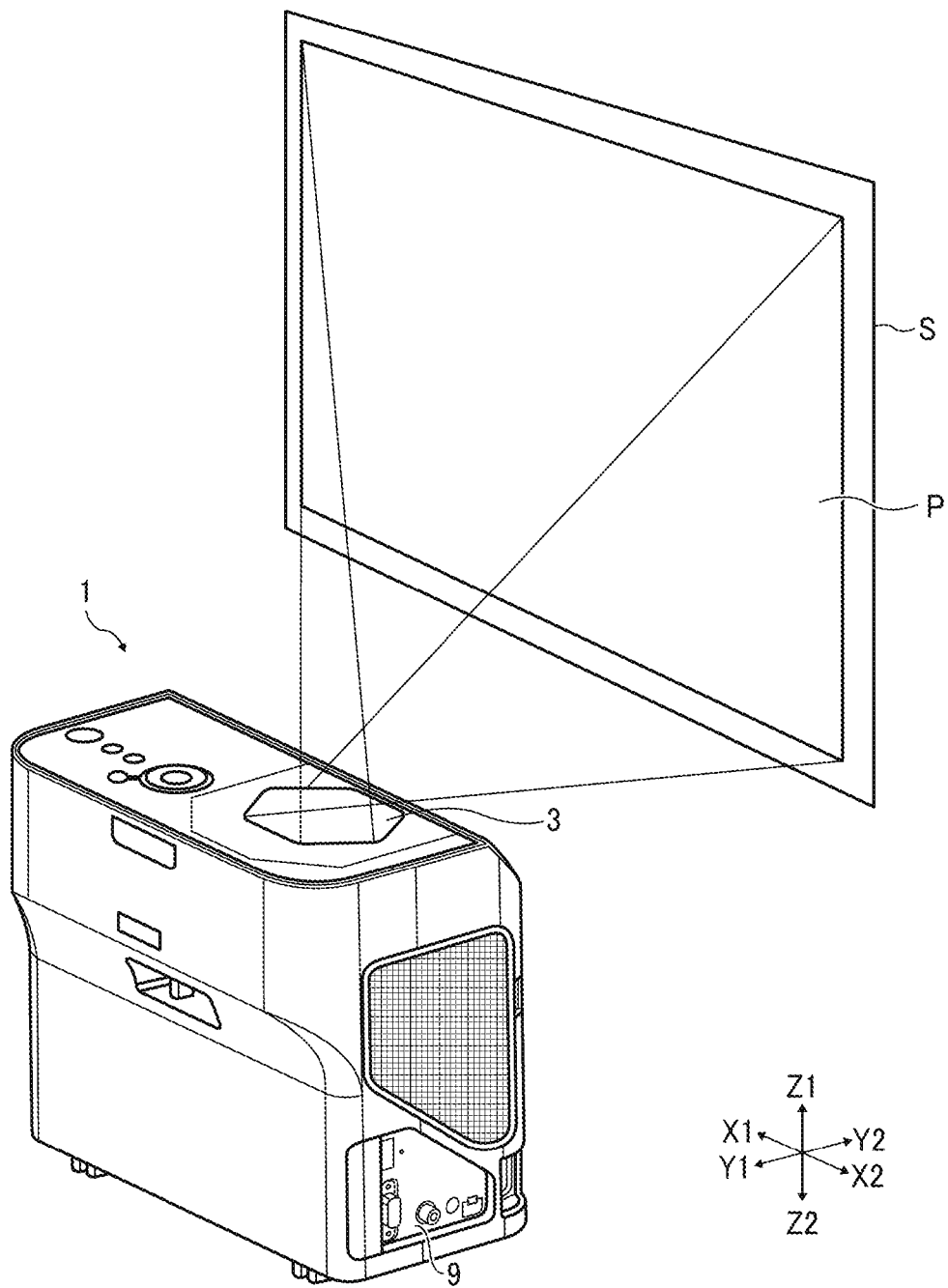
FIG. 1 is a schematic view of an image projection apparatus according to an embodiment of the present disclosure.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of embodiments of the present disclosure with reference to drawings. In this disclosure, components having the same or similar functional configuration among the embodiments of the present disclosure are assigned with the same references, and described by omitting the descriptions if redundant.

(Image Projection Apparatus)

FIG. 1 is a schematic view of a projector 1 according to an embodiment of the present disclosure.

The projector 1 is an example of image projection apparatuses. As illustrated in FIG. 1, the projector 1 includes, for example, an emission window 3 and an external interface (I/F) 9, and an optical engine for generating a projection image in a casing of the projector 1. As to the projector 1, for example, when image data is transmitted from a personal computer or a digital camera connected to the external I/F 9, the optical engine generates a projection image based on the received image data and projects the image from the emission window 3 to a screen S as illustrated in FIG. 1.

In the following drawings, an X1-X2 direction indicates a width direction of the projector 1, a Y1-Y2 direction indicates a depth direction of the projector 1, and a Z1-Z2 direction indicates a height direction of the projector 1. Further, a side where the emission window 3 of the projector 1 is provided may be described as an upper side of the projector 1, and a side opposite to the emission window 3 may be described as a lower side of the projector 1 in the Z1-Z2 direction.

FIG. 2A is a hardware block diagram of the projector 1 according to the embodiment.

As illustrated in FIG. 2A, the projector 1 includes, for example, a power supply 4, a main switch SW5, an operating unit 7, an external I/F 9, a system control unit 10, an optical engine 15, and a fan 20.

The power supply 4 is connected to a commercial power supply, converts a voltage and a frequency of the commercial power supply to voltage and a frequency for an internal circuit of the projector 1, and supplies power to the system control unit 10, the optical engine 15, the fan 20, and so on.

The main switch SW5 is used by a user to perform an ON/OFF operation of the projector 1. When the main switch SW5 is turned on when the power supply 4 is connected to the commercial power supply through a power cord, the power supply 4 starts to supply power to the units of the projector 1, and when the main switch SW5 is turned off, the power supply 4 stops the supply of power to the units of the projector 1.

The operating unit 7 includes a button and the like that receives various operations performed by the user, and is disposed on, for example, the top face of the projector 1. The operating unit 7 receives user operations such as a size, a color tone, and a focus adjustment of a projection image. The user operation received by the operating unit 7 is transmitted to the system control unit 10.

The external I/F 9 has a connection terminal connected to a device, for example, a personal computer or a digital camera, and outputs image data transmitted from the connected device to the system control unit 10.

Figure 2B:
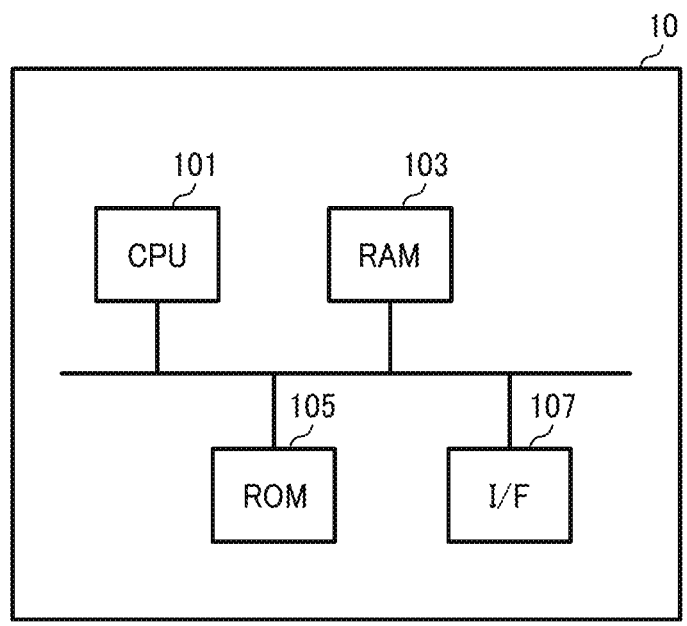
FIG. 2B is a hardware block diagram of an system control unit of the image projection apparatus of FIG. 1.

The system control unit 10 includes, for example, an image control unit 11, and a movement control unit 12. As illustrated in FIG. 2B, the system control unit 10 includes, for example, a central processing unit (CPU) 101, a read-only memory (ROM) 105, a random access memory (RAM) 103, and an interface (I/f) 107, and the functions of the units of the system control unit 10 such as the image control unit 11 and the movement control unit 12 are implemented when the CPU 101 executes programs stored in the ROM 105 in cooperation with the RAM 103, but not limited thereto. For example, at least part of the functions of the units of the system control unit 10 (image control unit 11, movement control unit 12) can be implemented by a dedicated hardware circuit (a semiconductor integrated circuit etc.). The program executed by the system control unit 10 according to the present embodiment may be configured to be provided by being recorded in a computer-readable recording medium such as a compact disk read only memory (CD-ROM), a flexible disk (FD), compact disk recordable (CD-R), a digital versatile disk (DVD), and a universal serial bus (USB) memory as a file of an installable format or of an executable format. Alternatively, the program may be configured to be provided or distributed through a network such as the Internet. Moreover, various programs may be configured to be provided by being pre-installed into a non-volatile recording medium such as ROM 105.

The image control unit 11 controls a digital micro mirror device (DMD) 551 disposed in an image display unit 50 of the optical engine 15 based on the image data input through the external I/F 9 to generate an image to be projected to the screen S. The DMD 551 is an example of the optical modulation element, and generates an image by using light emitted from a light source 30 described later. The image display unit 50 is an example of an image generating unit, image generation element, or image generator.

The movement control unit 12 controls a drive unit that moves a second unit 55, movably disposed in the image display unit 50, to control the position of the DMD 551 disposed in the second unit 55.

The fan 20 is rotated under a control of the system control unit 10 to cool the light source 30 of the optical engine 15.

As illustrated in FIG. 2A, the optical engine 15 includes, for example, a light source 30, a light guide unit 40, an image display unit 50, and a projection unit 60, and is controlled by the system control unit 10 to project an image to the screen S.

The light source 30 is, for example, a high-pressure mercury lamp, a Xenon lamp, and a light-emitting diode (LED), and is controlled by the system control unit 10 to emit the light to the light guide unit 40.

The light guide unit 40 includes, for example, a color wheel, a light tunnel, a relay lens, and the like, and guides the light emitted from the light source 30 to the DMD 551 disposed in the image display unit 50.

The image display unit 50 includes, for example, a first unit 51 fixedly supported in the projector 1, and a second unit 55 disposed movably with respect to the first unit 51. The second unit 55 includes, for example, the DMD 551, and the position of the second unit 55 with respect to the first unit 51 is controlled by the movement control unit 12 of the system control unit 10. The DMD 551 is an example of an image generator, and the DMD 551 is controlled by the image control unit 11 of the system control unit 10, and the DMD 551 modulates the light emitted from the light source 30 and guided to the DMD 551 by the light guide unit 40 to generate a projection image. In this description, the first unit 51 is fixedly supported in the projector 1 while the second unit 55 is disposed movably with respect to the first unit 51, which means the second unit 55 is movably supported by the first unit 51. Therefore, the first unit 51 may be also referred to as the non-movable unit 51 and while the second unit 55 may be also referred to as the movable unit 55.

The projection unit 60 includes, for example, a plurality of projection lenses, mirrors, and the like, and enlarges an image generated by the DMD 551 of the image display unit 50 to project the image to the screen S.

(Configuration of Optical Engine)

A description is given of a configuration of each of units of the optical engine 15 in the projector 1.

Figure 3:
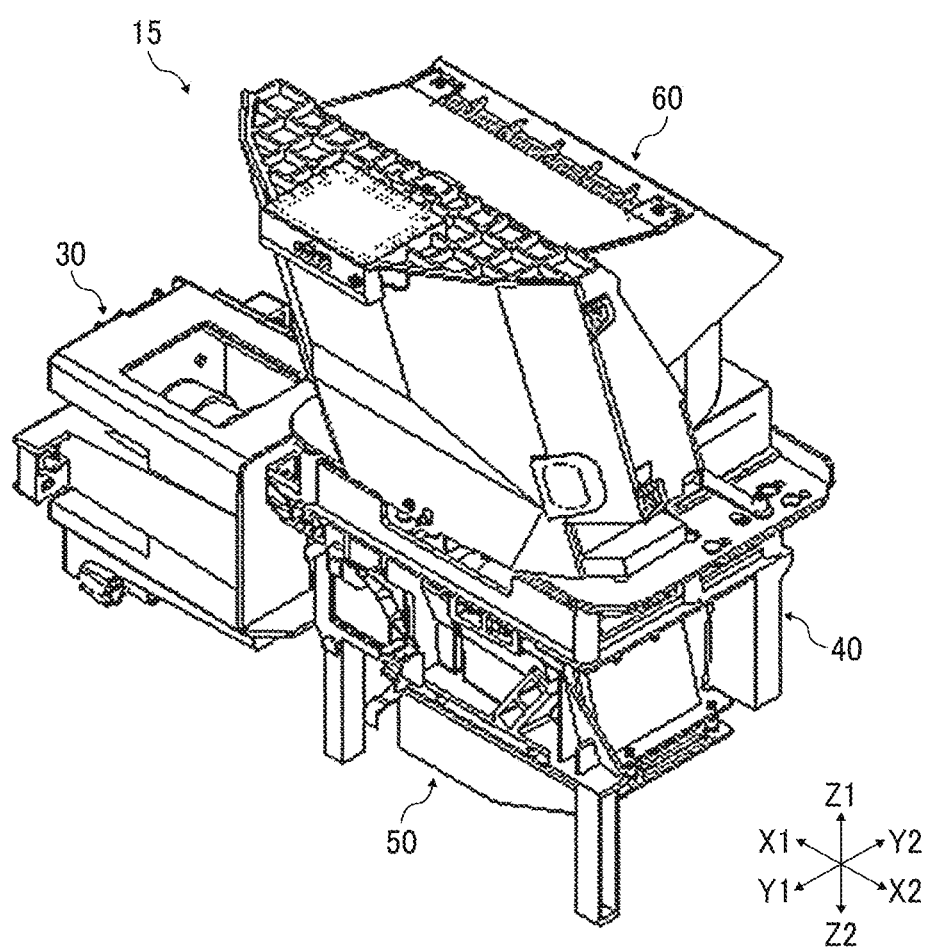
FIG. 3 is a perspective view of an optical engine of the image projection apparatus of FIG. 1.

FIG. 3 is a perspective view of the optical engine 15 according to the embodiment. As illustrated in FIG. 3, the optical engine 15 includes, for example, the light source 30, the light guide unit 40, the image display unit 50, and the projection unit 60, which are disposed inside the projector 1.

The light source 30 is disposed at one side of the light guide unit 40, and emits light in the X2 direction. The light guide unit 40 guides the light emitted from the light source 30 to the image display unit 50 disposed under the light guide unit 40. The image display unit 50 uses the light emitted from the light source 30 and guided by the light guide unit 40 to generate a projection image. The projection unit 60 is disposed over the light guide unit 40, and projects the projection image generated by the image display unit 50 to the outside of the projector 1.

The optical engine 15 according to the embodiment is configured to project the image upward using the light emitted from the light source 30, but not limited thereto. For example, the optical engine 15 can be configured to project the image horizontally.

Figure 4:
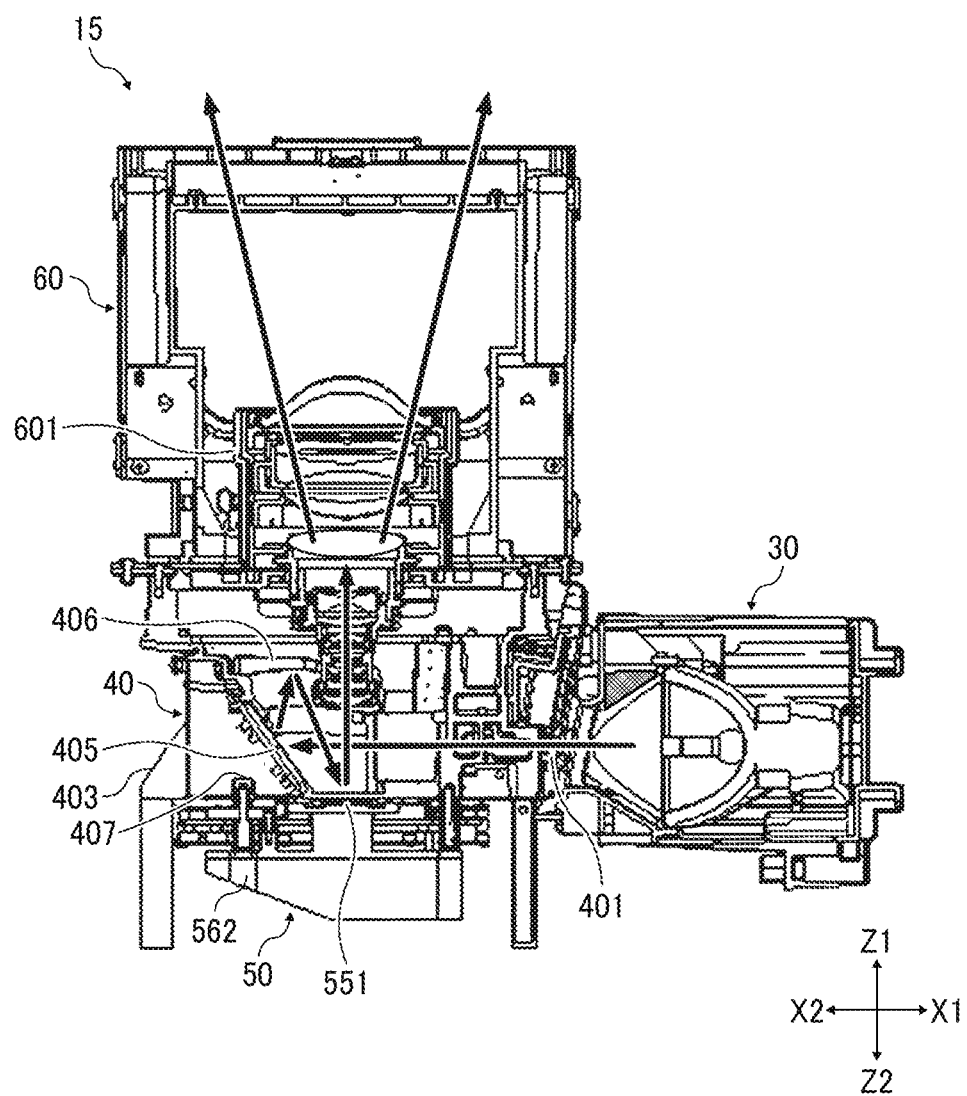
FIG. 4 is a schematic view of an internal configuration of the optical engine of the image projection apparatus of FIG. 1.
Figure 5:
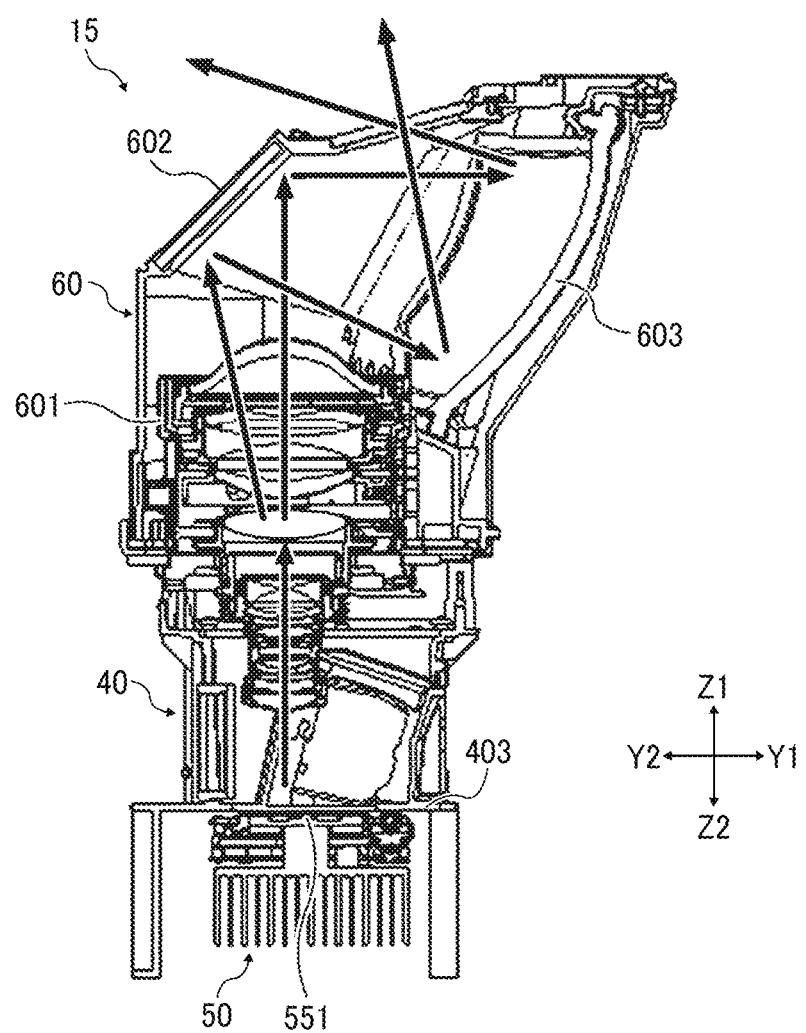
FIG. 5 is another schematic view of the internal configuration of the optical engine of the image projection apparatus of FIG. 1.

FIG. 4 is a schematic view of an internal configuration of the optical engine 15 according to the embodiment, and FIG. 5 is another schematic view of the internal configuration of the optical engine 15 according to the embodiment.

As illustrated in FIG. 4, the light guide unit 40 includes, for example, a color wheel 401, a light tunnel 402, a flat mirror 405, and a concave mirror 406.

The color wheel 401 is, for example, a disk having filters of R (Red) color, G (Green) color, and B (Blue) color arranged in different portions in the disk such as different portions in a circumferential direction of the disk. The color wheel 401 is configured to rotate with a high speed to divide the light emitted from the light source 30 into the RGB colors with a time division manner. The flat mirror 405 and the concave mirror 406 reflects the RGB light divided with the time division manner by the color wheel 401 to the DMD 551 disposed in the image display unit 50. The color wheel 401, the flat mirror 405, and the concave mirror 406 are supported by a base frame 403 that is fixed inside the casing of the projector 1.

The light guide unit 40 can further include a light tunnel and a relay lens, for example, between the color wheel 401 and the flat mirror 405.

The DMD 551 modulates the light reflected from the concave mirror 406 to generate a projection image. The projection image generated by the DMD 551 is guided to the projection unit 60 via the light guide unit 40.

As illustrated in FIG. 5, the projection unit 60 includes, for example, a projection lens 601, a reflection mirror 602, and a curved mirror 603 disposed inside a casing of the projection unit 60.

The projection lens 601 includes, for example, a plurality of lenses, and forms a projection image generated by the DMD 551 of the image display unit 50 on the reflection mirror 602. The reflection mirror 602 and the curved mirror 603 reflect the formed projection image by enlarging the projection image, and projects the enlarged projection image to the screen S or the like disposed outside the projector 1.

(Image Display Unit)

Figure 6:
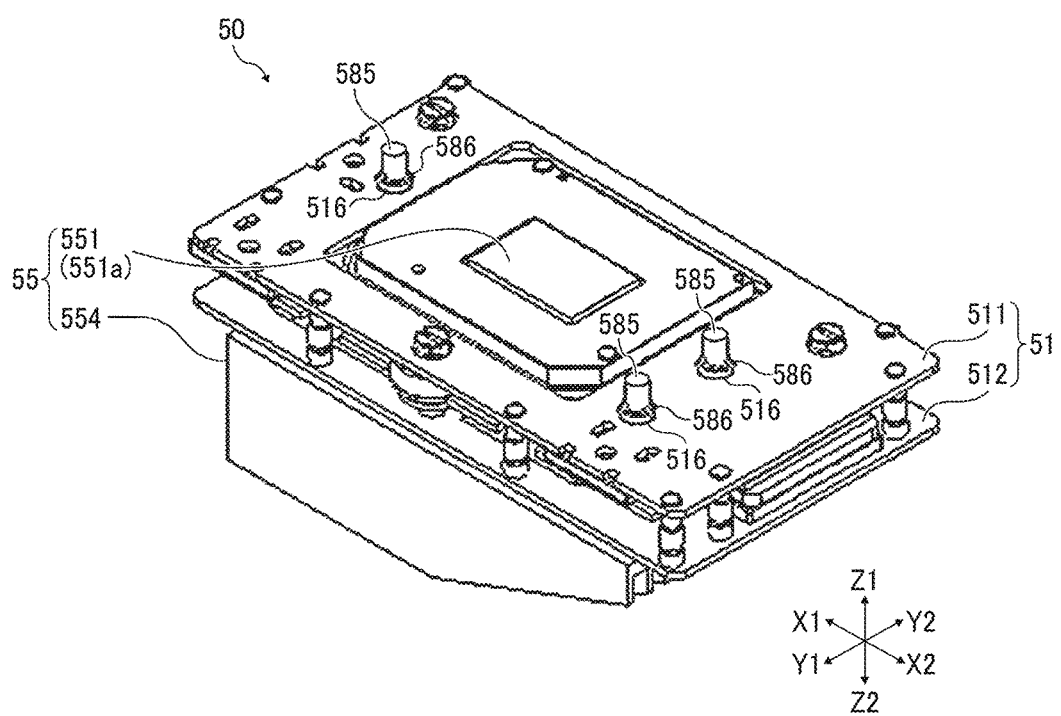
FIG. 6 is a perspective view of an image display unit of the image projection apparatus of FIG. 1.
Figure 7:
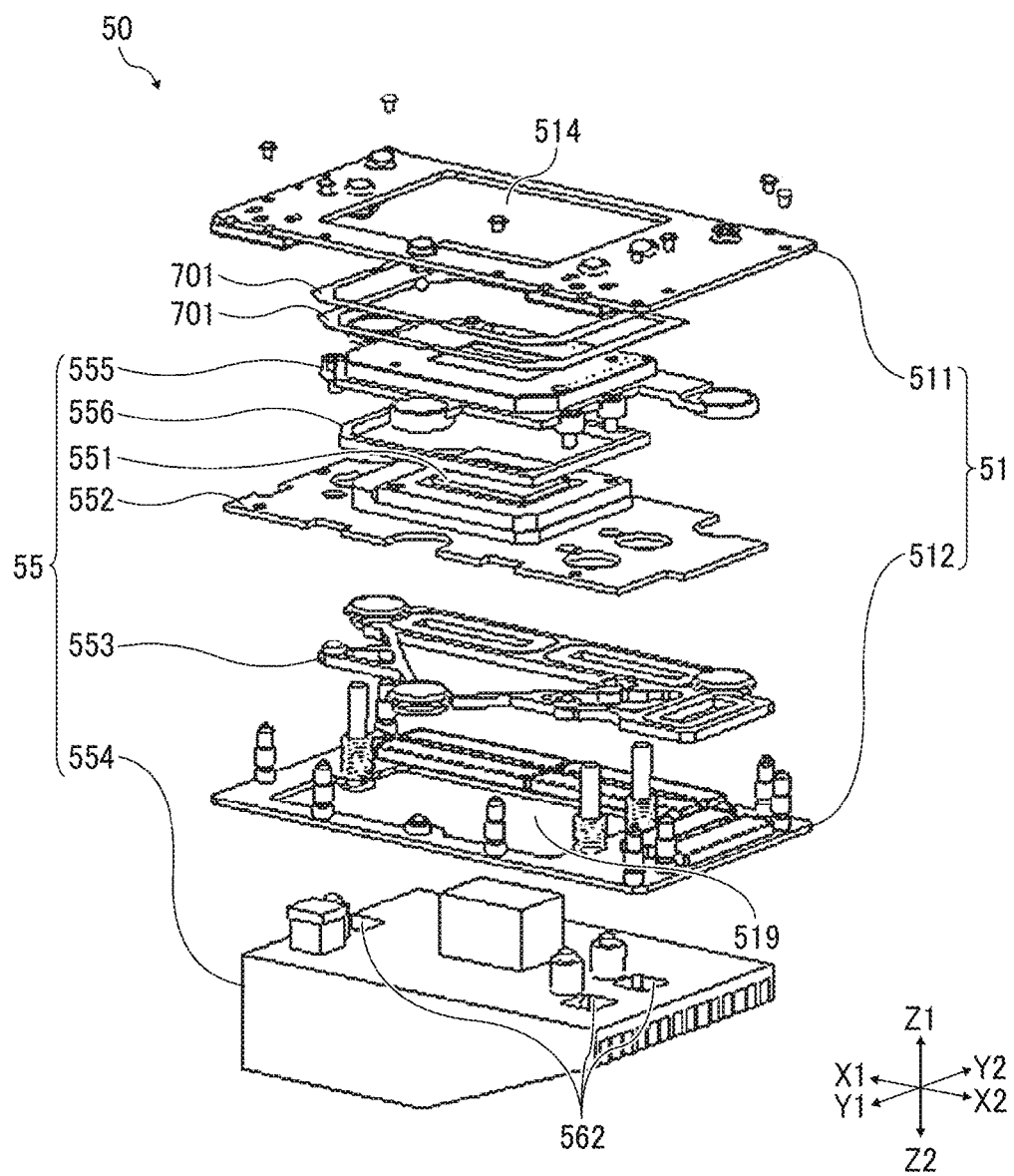
FIG. 7 is an exploded perspective view of the image display unit of FIG. 6.

FIG. 6 is a perspective view of the image display unit 50 according to the embodiment. FIG. 7 is an exploded perspective view of the image display unit 50 according to the embodiment.

As illustrated in FIGS. 6 and 7, the image display unit 50 includes, for example, the first unit 51 and the second unit 55. The first unit 51 is fixedly supported to the light guide unit 40, and the second unit 55 is movably supported by the first unit 51.

As illustrated in FIG. 6, the first unit 51 includes, for example, a top plate 511, and a base plate 512. The first unit 51 is fixed to a bottom face of the base frame 403 of the light guide unit 40. The top plate 511 and the base plate 512 are disposed in parallel to each other with setting a given space between the top plate 511 and the base plate 512.

As illustrated in FIG. 7, the second unit 55 includes, for example, the DMD 551, a DMD base 552, a movable plate 553, a heat sink 554, a bracket 555, and a dust-proof absorber 556, and the second unit 55 is movably supported by the first unit 51.

Further, as illustrated in FIG. 7, the image display unit 50 includes a plurality of dust-proof sheets 701. When the plurality of dust-proof sheets 701 is set between the base frame 403 of the light guide unit 40 and the bracket 555 of the image display unit 50 to fill a gap between the light guide unit 40 and the image display unit 50, an intrusion of dust inside the image display unit 50 and adhesion of dust to the DMD 551 can be reduced.

(Second Unit)

Figure 8:
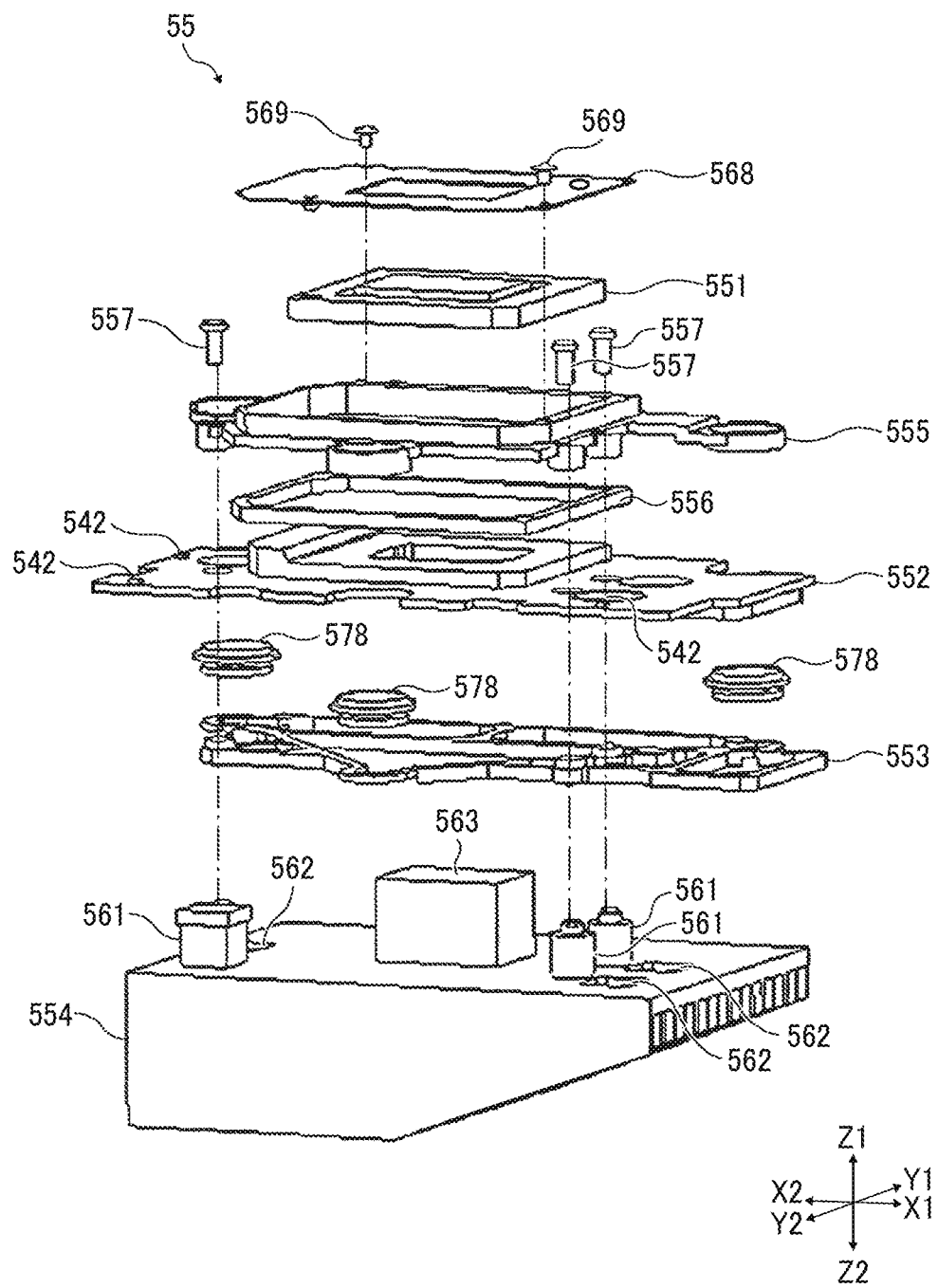
FIG. 8 is an exploded perspective view of a second unit of the image projection apparatus of FIG. 1.

FIG. 8 is an exploded perspective view of the second unit 55 of the embodiment.

As illustrated in FIG. 8, the second unit 55 includes, for example, the DMD 551, the movable plate 553, the heat sink 554, the bracket 555, and the dust-proof absorber 556.

The DMD 551 is disposed on a top face of the DMD base 552. The DMD 551 includes, for example, an image generation plane 551a (FIG. 16) where a plurality of movable micro mirrors are arranged in a lattice pattern. Each of the micro mirrors of the DMD 551 is tiltable about a torsion axis, and thereby an inclination angle of a mirror surface of each of the micro mirrors about the torsion axis is changeable. Each of the micro mirrors of the DMD 551 is ON/OFF-driven based on an image signal transmitted from the image control unit 11 of the system control unit 10.

For example, in the case of "ON," the inclination angle of the micro mirror is controlled so as to reflect the light emitted from the light source 30 to the projection unit 60. For example, in the case of "OFF," the inclination angle of the micro mirror is controlled into a direction for reflecting the light emitted from the light source 30 toward an OFF light plate.

In this way, the DMD 551 is configured to control the inclination angle of each micro mirror based on the image signal transmitted from the image control unit 11, and modulate the light emitted from the light source 30 and passing through the light guide unit 40 to generate a projection image.

As illustrated in FIG. 7, the DMD 551 is disposed on a top face of the DMD base 552. Further, the bracket 555 that encircling the periphery of the DMD 551 is attached to the DMD base 552. The dust-proof absorber 556 is disposed between the DMD base 552 and the bracket 555. As illustrated in FIG. 8, a cover 568 that covers the periphery of the DMD 551 is attached to the bracket 555 by a cover screw 569.

The dust-proof absorber 556 encircles the periphery of the DMD 551, and fills a gap between the bracket 555 and the DMD base 552, with which an intrusion of dust inside the image display unit 50 from the gap between the bracket 555 and the DMD base 552, and adhesion of dust to the DMD 551 can be reduced.

The DMD base 552 is fixed to a support pillar 561 of the heat sink 554 with the bracket 555 and the movable plate 553 by a fixing screw 557.

Further, as illustrated in FIG. 8, a plurality of Hall element 542 is disposed on the top face of the DMD base 552. The Hall element 542 is an example of a magnetic sensor. The Hall element 542 transmits a detection signal to the movement control unit 12 of the system control unit 10. The detection signal output from the Hall element 542 is used to detect a position of the DMD 551.

Figure 9:
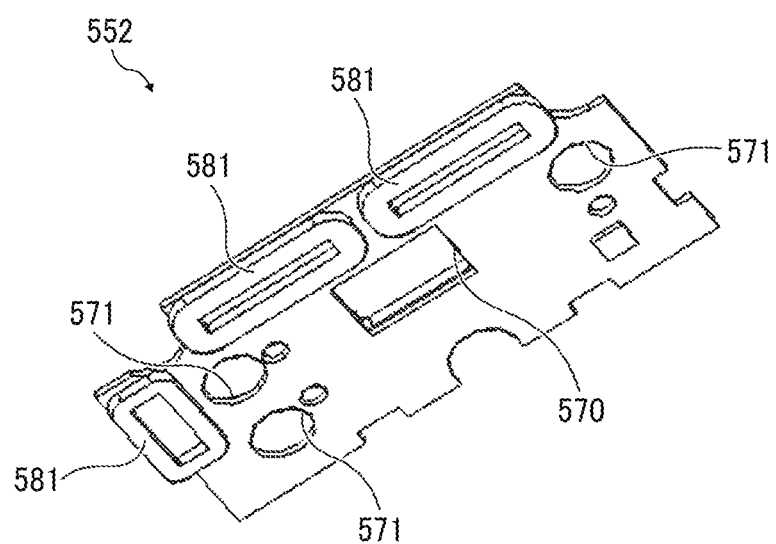
FIG. 9 is a perspective view of a DMD base viewed from a bottom face.

FIG. 9 is a perspective view of the DMD base 552 viewed from a bottom face of the DMD base 552.

As illustrated in FIG. 9, a center hole 570 and a through hole 571 are formed for the DMD base 552. The center hole 570 is formed at a position corresponding to the DMD 551 disposed on the DMD base 552.

Further, as illustrated in FIG. 9, a plurality of drive coils 581 is disposed on the bottom face of the DMD base 552. The drive coil 581, formed by winding wire for a plurality of times, is attached on the bottom face of the DMD base 552 and covered by a cover.

The movable plate 553 is movably supported by the top plate 511 and the base plate 512 of the first unit 51 such that the movable plate 553 is movable in any directions on the XY plane. As illustrated in FIG. 8, a plurality of circular cylindrical reception member 578 is attached to the movable plate 553. The movable plate 553 is fixed to the support pillar 561 of the heat sink 554 with the DMD base 552 by the fixing screw 557.

As illustrated in FIG. 8, the heat sink 554 includes, for example, a heat radiating unit 563 at a position facing the DMD 551. The heat radiating unit 563 is in contact with the bottom face of the DMD 551 through the center hole 570 of the DMD base 552 such that heat generated at the DMD 551 is conducted to the heat radiating unit 563. The heat conducted to the heat radiating unit 563 from the DMD 551 is radiated from the heat sink 554, with which an increase of temperature of the DMD 551 can be suppressed. In the above described configuration, the heat sink 554 cools the DMD 551, with which occurrence of troubles such as a malfunction or a failure due to the increase of temperature of the DMD 551 can be reduced.

The second unit 55 having the above described configuration is movably supported by the first unit 51. By disposing the heat sink 554 for the second unit 55, the DMD 551 can be cooled constantly by the heat sink 554, with which occurrence of troubles can be reduced.

(First Unit)

Figure 10:
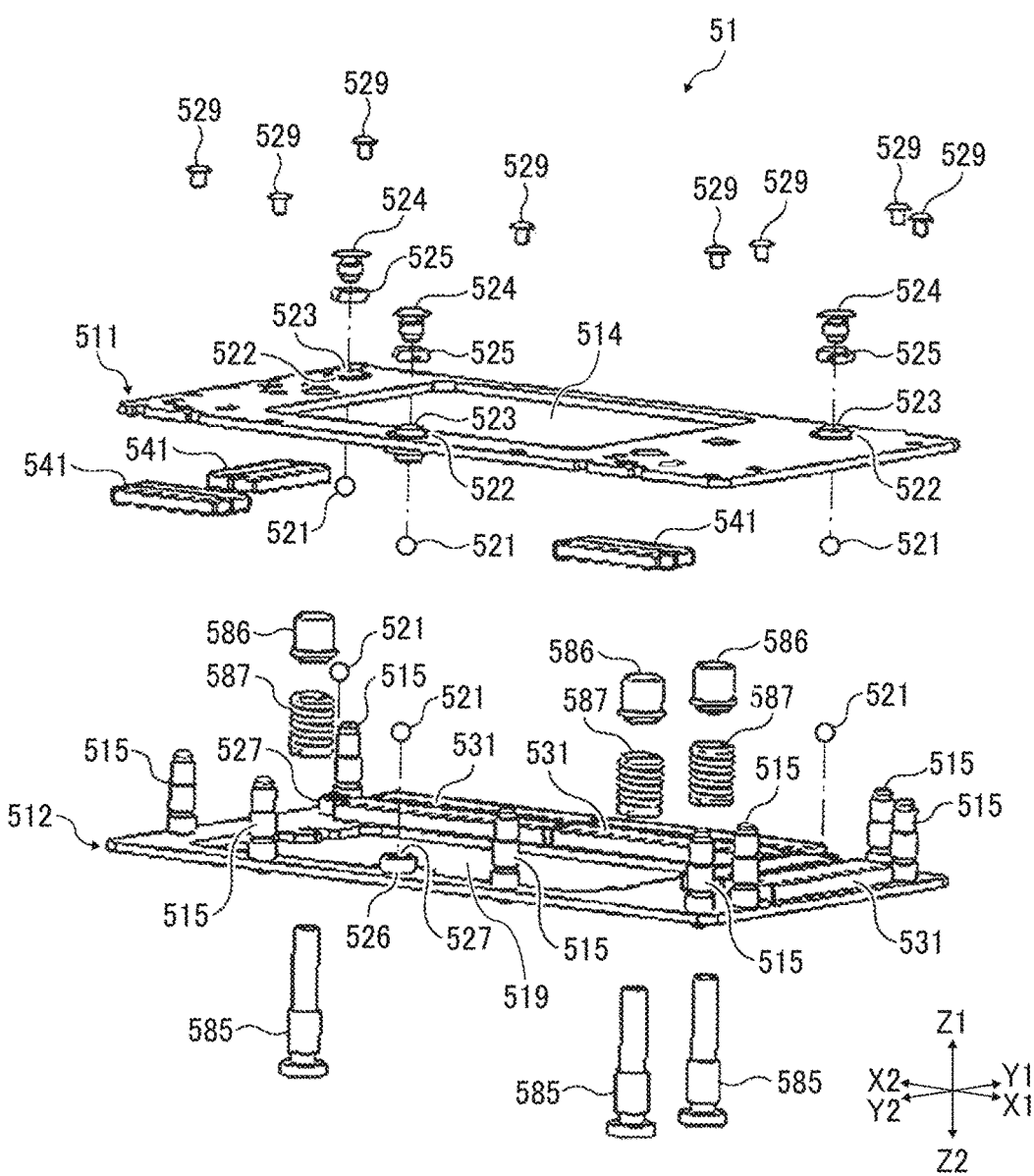
FIG. 10 is an exploded perspective view of a first unit of the image projection apparatus of FIG. 1.
Figure 11:
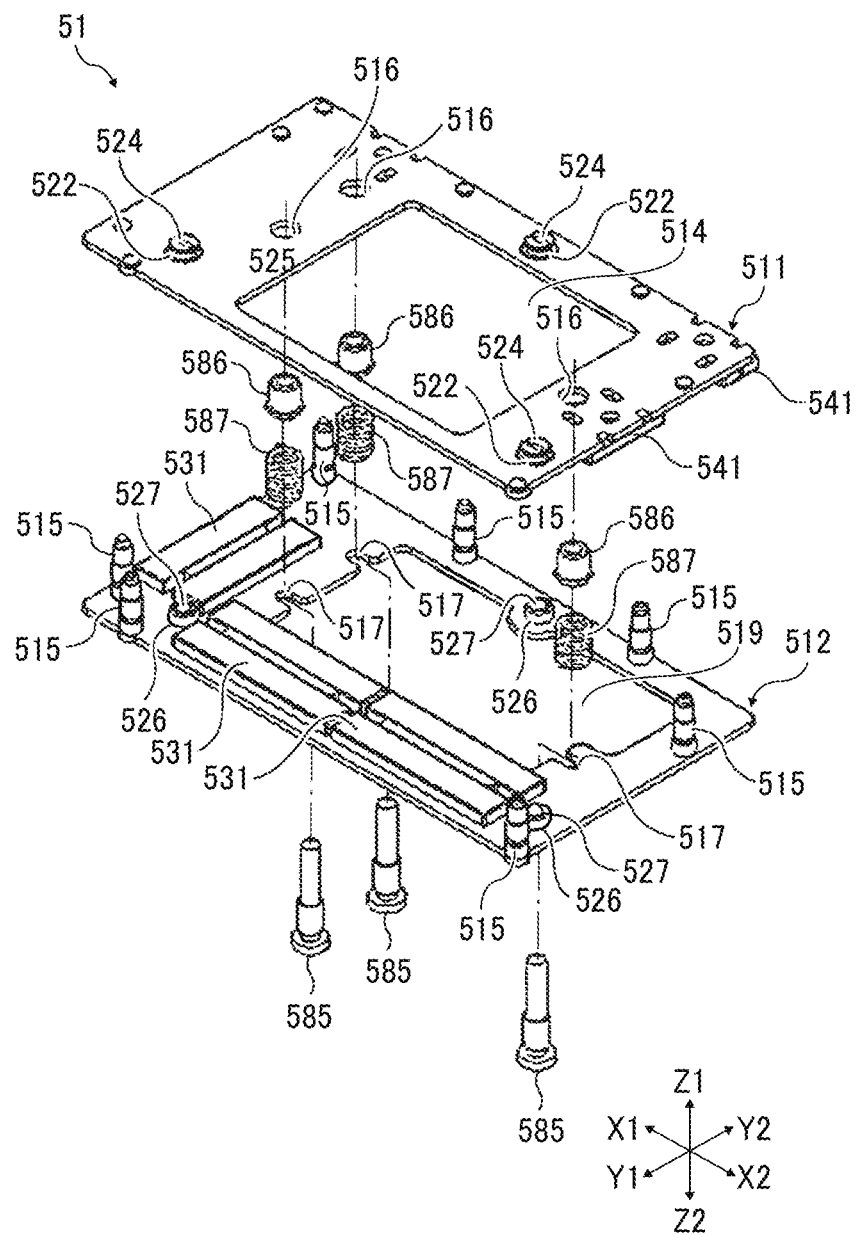
FIG. 11 is another exploded perspective view of the first unit of the image projection apparatus of FIG. 1.

FIG. 10 is an exploded perspective view of the first unit 51 according to the embodiment. FIG. 11 is another exploded perspective view of the first unit 51 according to the embodiment. FIGS. 10 and 11 illustrate exploded perspective views of the first unit 51 from different angles.

As illustrated in FIGS. 10 and 11, the first unit 51 includes, for example, the top plate 511 and the base plate 512.

The top plate 511 is fixed to a top end of a support pillar 515 attached to the base plate 512 by a fixing screw 529 (FIG. 10). As illustrated in FIGS. 7 and 11, a center hole 514 is formed for the top plate 511 at a position corresponding to the DMD 551 disposed in the second unit 55. Further, a center hole 519 is formed for the base plate 512 at a position corresponding to the DMD 551 disposed in the second unit 55.

A bottom end of the support pillar 515 is fixed to the base plate 512 while the top end of the support pillar 515 is fixed to the top plate 511 by the fixing screw 529 (FIG. 10). The support pillar 515 is used to set a given space between the top plate 511 and the base plate 512, and to support the top plate 511 and the base plate 512 in parallel to each other.

Further, as illustrated in FIG. 10, a plurality of support holes 522 is formed for the top plate 511. As illustrated in FIG. 10, a upper-side supporter 523 is disposed for each of the support holes 522. The upper-side supporter 523 has a cylindrical shape having female threads on an inner face of the cylindrical shape. A position adjustment screw 524 is inserted in the upper-side supporter 523 via a spring 525, and the upper-side supporter 523 rotatably support a support ball 521, in which the support ball 521 can be rotatable on the upper-side supporter 523. Further, a plurality of support holes 526 is formed for the base plate 512, and a lower-side supporter 527 is disposed for each of the support hole 526. The lower-side supporter 527 rotatably supports the support ball 521, in which the support ball 521 can be rotatable on the lower-side supporter 527.

The support ball 521 rotatably supported by the upper-side supporter 523 disposed for the support hole 522 of the top plate 511 contacts a top face of the circular cylindrical reception member 578 attached to the movable plate 553 of the second unit 55. Further, the support ball 521 rotatably supported by the lower-side supporter 527 disposed for the support hole 526 of the base plate 512 contacts a bottom face of the circular cylindrical reception member 578 attached to the movable plate 553 of the second unit 55.

When the circular cylindrical reception member 578 is sandwiched by the support balls 521 from the top face and the bottom face of the circular cylindrical reception member 578, the movable plate 553 of the second unit 55 is movably supported between the top plate 511 and the base plate 512.

Figure 12:
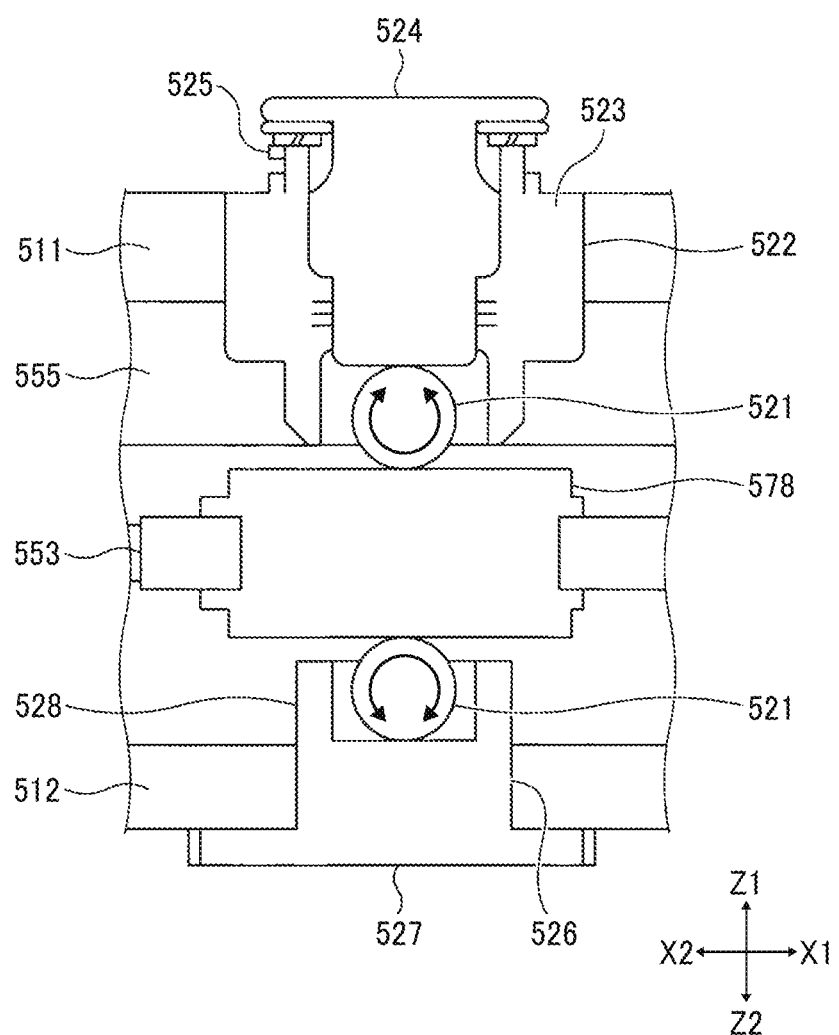
FIG. 12 illustrates a configuration of the first unit that supports a movable plate of the second unit.

FIG. 12 illustrates a configuration of the first unit 51 that supports the movable plate 553 of the second unit 55 of the embodiment.

As illustrated in FIG. 12, at the top plate 511 of the first unit 51, the support ball 521 is rotatably supported by the upper-side supporter 523 inserted in the support hole 522 of the top plate 511. Further, at the base plate 512 of the first unit 51, the support ball 521 is rotatably supported by a cylindrical portion 528 of the lower-side supporter 527 inserted in the support hole 526 of the base plate 512.

As illustrated in FIG. 12, the support ball 521 is supported by the upper-side supporter 523 while protruding a part of the support ball 521 from the upper-side supporter 523, and the support ball 521 is supported by the lower-side supporter 527 while protruding a part of the support ball 521 from the lower-side supporter 527. Therefore, as illustrated in FIG. 12, the support ball 521 supported by the upper-side supporter 523 contacts the circular cylindrical reception member 578 attached to the movable plate 553 while the support ball 521 supported by the lower-side supporter 527 contacts the circular cylindrical reception member 578 attached to the movable plate 553.

The movable plate 553 is movably supported between the top plate 511 and the base plate 512 by sandwiching the circular cylindrical reception member 578 using a plurality of the support balls 521, which are disposed rotatably, from the top face and the bottom face of the circular cylindrical reception member 578, in which the movable plate 553 is movable in parallel to the top plate 511 and the base plate 512.

Further, as to the support ball 521 supported by the upper-side supporter 523, a protrusion length of the support ball 521 from the bottom end of the upper-side supporter 523 can be changed based on a position of the position adjustment screw 524. For example, when the support ball 521 is moved into the Z1 direction by rotating the position adjustment screw 524, the protrusion length of the support ball 521 decreases, with which the space between the top plate 511 and the movable plate 553 becomes smaller. Further, for example, when the support ball 521 is moved into the Z2 direction by rotating the position adjustment screw 524, the protrusion length of the support ball 521 increases, with which the space between the top plate 511 and the movable plate 553 becomes greater.

As above described, by changing the protrusion length of the support ball 521 from the upper-side supporter 523 by using the position adjustment screw 524, the space between the top plate 511 and the movable plate 553 can be adjusted.

As illustrated in FIGS. 10 and 11, a plurality of position-detection magnets 541 is disposed on the bottom face of the top plate 511. Each of the position-detection magnets 541 disposed on the bottom face of the top plate 511 respectively faces one of the Hall elements 542 disposed on the DMD base 552 of the second unit 55. A combination of the position-detection magnet 541 and the Hall element 542, disposed with a face-to-face configuration, configure a position detector that detects a position of the DMD 551.

When the second unit 55 is moved relative to the first unit 51, a positional relationship of the Hall element 542 disposed on the DMD base 552 of the second unit 55 and the position-detection magnet 541 disposed on the top plate 511 of the first unit 51 changes, in which a magnetic flux density generated by the position-detection magnet 541 and received by the Hall element 542 changes. The Hall element 542 transmits a signal corresponding to the change of magnetic flux density formed between the Hall element 542 and the position-detection magnet 541, caused by the movement of the second unit 55, to the movement control unit 12 of the system control unit 10. Then, the movement control unit 12 detects a position of the DMD 551 based on the signal received from the Hall element 542.

Further, as illustrated in FIGS. 10 and 11, a plurality of drive-use magnet units 531 is disposed on the top face of the base plate 512. Each of the drive-use magnet units 531 includes two permanent magnets having rectangular parallelepiped shape and arranged in parallel along a long side. Each of the drive-use magnet units 531 is disposed on the top face of the base plate 512 to respectively face one of the drive coils 581 disposed on the DMD base 552 of the second unit 55. A combination of the drive-use magnet unit 531 and the drive coil 581, disposed with a face-to-face configuration, configure a drive unit that moves the second unit 55 relative to the first unit 51.

When a current flows in the drive coil 581 in the above described configuration, the Lorentz force occurs by a magnetic field formed by the drive-use magnet unit 531, and then the Lorentz force becomes a drive force to move the second unit 55 including the DMD base 552 disposed with the drive coil 581 (FIG. 9).

When the Lorentz force is generated by the drive unit including the drive-use magnet unit 531 and the drive coil 581, the Lorentz force moves the second unit 55. Specifically, the Lorentz force moves the second unit 55 along a straight line direction on the XY plane relative to the first unit 51 or the Lorentz force moves the second unit 55 rotatingly on the XY plan relative to the first unit 51.

The movement control unit 12 of the system control unit 10 controls a current level and direction supplied to each of the drive coils 581. The movement control unit 12 controls a movement direction such as a straight movement direction and a rotational movement direction, a movement amount, and a rotation angle of the movable plate 553 by controlling the current level and direction supplied to each of the drive coils 581.

The movement control unit 12 detects a position of the DMD 551 based on an signal output from the Hall element 542, and controls the current level and direction supplied to each of the drive coils 581 based on the position of the DMD 551 to control the position of the DMD 551.

For example, the movement control unit 12 controls the position of the second unit 55 with a given cycle corresponding to a frame rate set for an image projection operation so that the second unit 55 can move with a faster speed between a plurality of positions distanced with each other less than a distance of an arrangement interval of the plurality of micro mirrors of the DMD 551, in which the image control unit 11 transmits an image signal to the DMD 551 corresponding to a position of the second unit 55 shifted by the movement of the second unit 55 to generate a projection image.

For example, the movement control unit 12 reciprocally moves the DMD 551 between a first position P1 and a second position P2 distanced with each other less than the distance of the arrangement interval of the plurality of micro mirrors of the DMD 551 in the X1-X2 direction and the Y1-Y2 direction with a given cycle. In this configuration, the image control unit 11 controls the DMD 551 to generate a projection image corresponding the position of the second unit 55 shifted by the movement of the second unit 55 to generate a projection image, with which the resolution level of the projection image can be set about two times of the resolution level of the DMD 551. Further, the resolution level of the projection image can be set greater than the two times of the resolution level of the DMD 551 by increasing the number positions used for the movement of the DMD 551.

As above described, when the movement control unit 12 moves or sifts the DMD 551 included in the second unit 55, the image control unit 11 can generate a projection image corresponding to a sifted position of the DMD 551, with which an image having a resolution level higher than the resolution level of the DMD 551 can be projected.

Further, as to the projector 1 of the above described embodiment, the movement control unit 12 can control the DMD 551 and the second unit 55 concurrently, which means the movement control unit 12 can rotate the DMD 551 and the second unit 55 concurrently, with which a projection image can be rotated without reducing a size of the projection image. Conventionally, an image generator (e.g., DMD) is fixed in a projector, in which a size of a projection image is required to be reduced to rotate the projection image while maintaining an aspect ratio of the projection image. By contrast, the DMD 551 can be rotated in the projector 1 of the embodiment. Therefore, a projection image can be rotated without reducing a size of the projection image, and an inclination of the projection image can be adjusted.

Further, the number and position of the position-detection magnet 541 and the Hall element 542 used as the position detector is not limited to the above described number and position. The number and position of the position-detection magnet 541 and the Hall element 542 used as the position detector can be changed as long as the position detector can detect a position of the DMD 551 correctly. Further, the number and position of the drive-use magnet units 531 and the drive coils 581 used as the drive unit is not limited to the above described number and position. The number and position of the drive-use magnet units 531 and the drive coils 581 used as the drive unit can be changed as long as the drive unit can move the second unit 55 relative to the first unit 51.

For example, the position detector (i.e., position-detection magnet 541, Hall element 542) can be disposed between the base plate 512 and the DMD base 552, and the drive unit (i.e., drive-use magnet unit 531, drive coil 581) can be disposed between the top plate 511 and the DMD base 552. Further, the drive-use magnet unit 531 and the position-detection magnet 541 can be disposed on the DMD base 552 or the movable plate 553. Further, when to reduce the weight of the second unit 55, the drive-use magnet unit 531 and the position-detection magnet 541 are preferably disposed on the first unit 51.

(Link Unit)

A description is given of a link unit 580 that supportingly fixes the first unit 51 to the base frame 403 of the light guide unit 40.

Figure 13A:
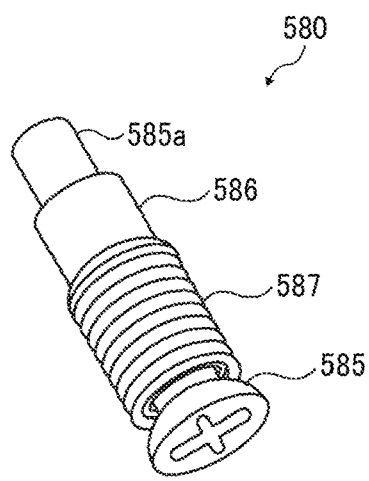
FIGS. 13A and 13B illustrate an example of a link unit of an embodiment.
Figure 13B:
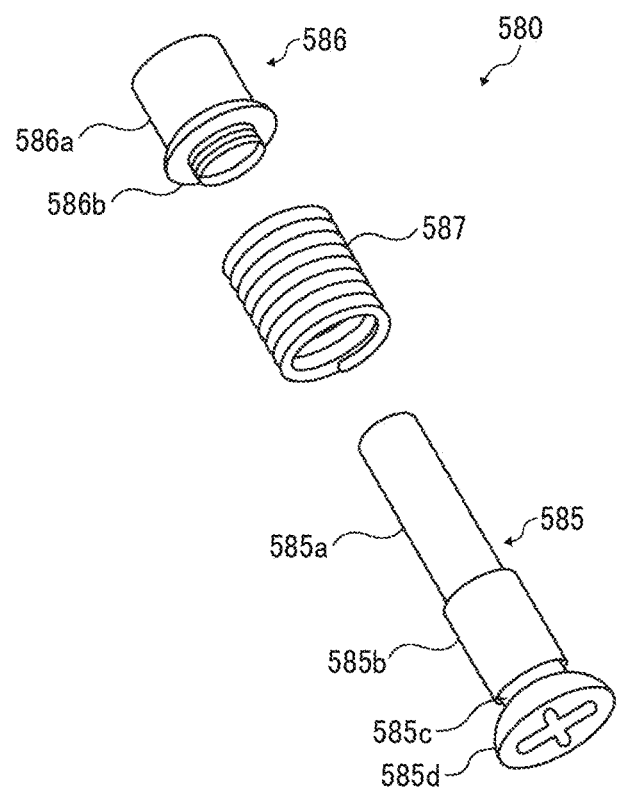

FIG. 13 illustrates an example of the link unit 580 of the embodiment. FIG. 13A is a perspective view of the link unit 580. Further, FIG. 13B is an exploded perspective view of the link unit 580.

As illustrated in FIG. 13A, the link unit 580 includes, for example, a joint screw 585 used as a linking member, a pressing member 586, and a helical compression spring 587 used as a bias member.

As illustrated in FIG. 13B, the joint screw 585 includes, for example, a threaded portion 58a, a body portion 585b, a groove portion 585c, and a head portion 585d. Male threads are formed on a surface of the threaded portion 58a. The body portion 585b is formed into a cylindrical shape having an outer diameter that is greater than an outer diameter of the threaded portion 58a. The groove portion 585c has an outer diameter that is smaller than the outer diameter of the body portion 585b and the outer diameter of the head portion 585d, and the groove portion 585c is formed between the body portion 585b and the head portion 585d while the groove portion 585c is concaved between the body portion 585b and the head portion 585d.

As illustrated in FIG. 13B, the pressing member 586 includes, for example, a press portion 586a having a cylindrical shape, and a flange portion 586b that protrudes outside from one end of the press portion 586a. The threaded portion 58a and the body portion 585b of the joint screw 585 is inserted into a hollow portion of the pressing member 586 and the helical compression spring 587. When the joint screw 585 is inserted into the hollow portion of the pressing member 586 and the helical compression spring 587, the helical compression spring 587 is sandwiched by the head portion 585d of the joint screw 585 and the flange portion 586b of the pressing member 586 as illustrated in FIG. 13A.

As illustrated in FIG. 11, a plurality of U-grooves 517 is formed for the base plate 512 of the first unit 51. As illustrated in FIG. 11, the plurality of U-grooves 517 is formed at peripheral portions of the center hole 519 such that the plurality of U-grooves 517 is grooved toward the outside direction of the base plate 512. The joint screw 585 is attached to the base plate 512 by engaging the groove portion 585c, formed between the body portion 585b and the head portion 585d, to the U-groove 517.

In this configuration, the joint screw 585, the pressing member 586, and the helical compression spring 587 are attached to the U-grooves 517 of the base plate 512, and then the top plate 511 is fixed to the top end of the support pillar 515 of the base plate 512.

As illustrated in FIG. 11, a screw hole 516 is formed for the top plate 511 wherein the screw hole 516 is used to insert the pressing member 586. When the top plate 511 is attached to the support pillar 515 of the base plate 512, the press portion 586a of the pressing member 586 and the threaded portion 58a of the joint screw 585 protrude from the screw hole 516 of the top plate 511 as illustrated in FIG. 6.

The diameter of the screw hole 516 is set greater than the outer diameter of the press portion 586a of the pressing member 586, and is set smaller than the outer diameter of the flange portion 586b of the pressing member 586. Therefore, the flange portion 586b of the pressing member 586 attached to the joint screw 585 cannot pass through the screw hole 516. With this configuration, the pressing member 586 and the helical compression spring 587 attached to the joint screw 585 do not pass through from the screw hole 516 to the top face of the top plate 511.

As above described, the image display unit 50 is supportingly fixed to the base frame 403 of the light guide unit 40 by using the link unit 580 disposed for the first unit 51. The base frame 403 of the light guide unit 40 is used as an example of a receiving frame where the image display unit 50 is fixed. Further, the image display unit 50 can be fixed to any portions other than the base frame 403. For example, the image display unit 50 can be fixed to other portions such as a casing of the projector 1, the projection unit 60 or the like.

Figure 14:
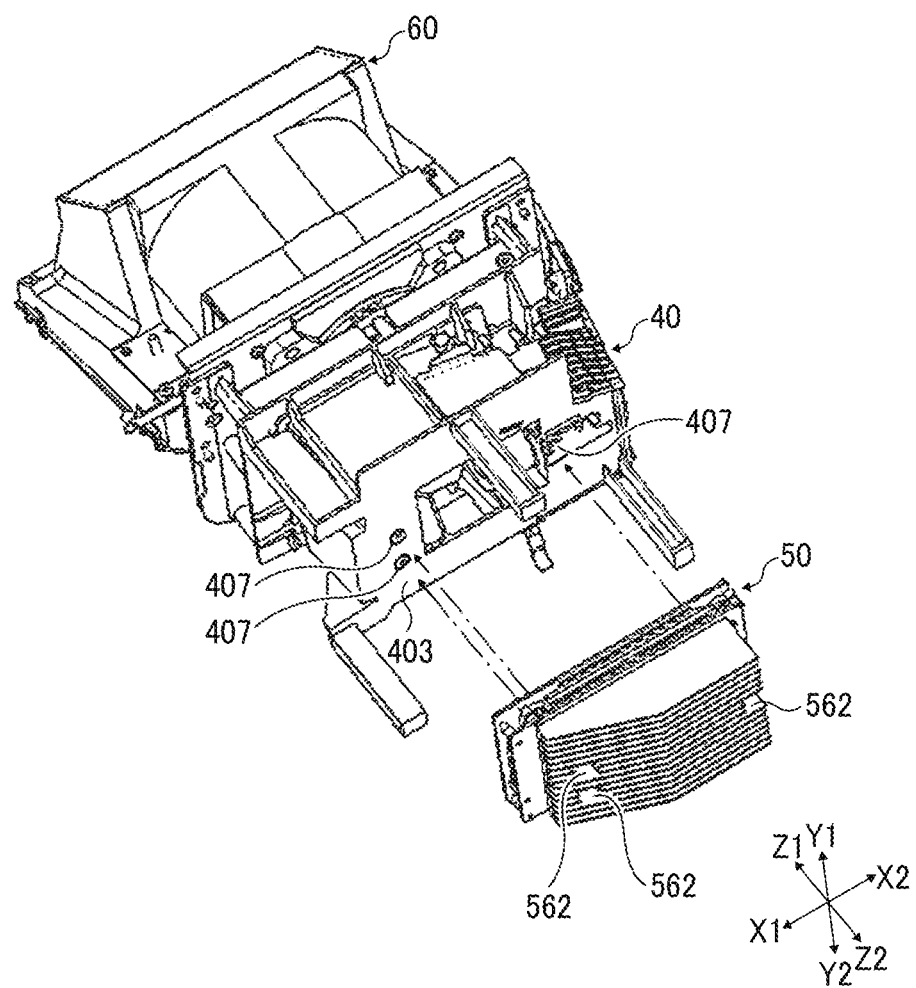
FIG. 14 illustrates an example of an attachment of the image display unit to a light guide unit of an embodiment.
Figure 15:
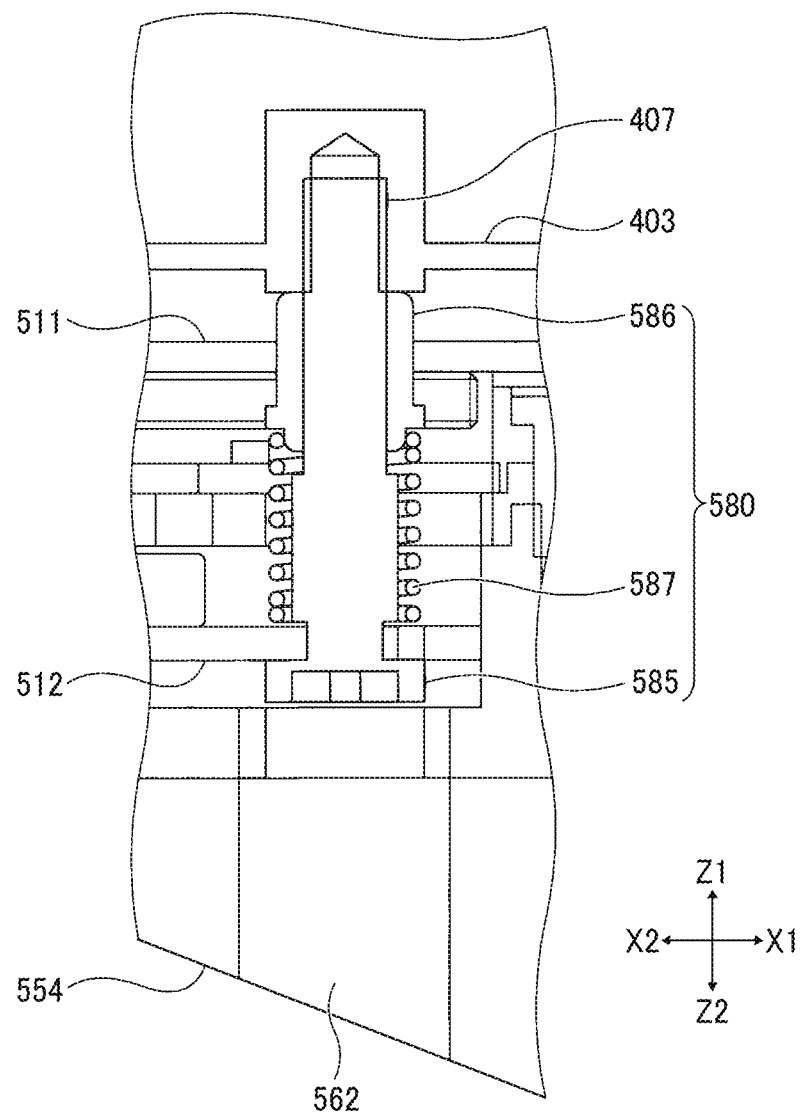
FIG. 15 illustrates an example of a configuration of fixing the image display unit to the light guide unit by using the link unit of an embodiment.

FIG. 14 illustrates an example of an attachment of the image display unit 50 to the light guide unit 40 of the embodiment. FIG. 15 illustrates an example of a configuration of fixing the image display unit 50 to the light guide unit 40 by using the link unit 580 of the embodiment, which is a schematic cross sectional view of the joint screw 585 along the XZ plane.

At first, when the image display unit 50 is to be attached to the light guide unit 40, a position of the joint screw 585 of the link unit 580 of the image display unit 50 and a position of a fix-use hole 407 formed for the base frame 403 of the light guide unit 40 are aligned as illustrated in FIG. 14.

Then, the joint screw 585 is rotated to insert the joint screw 585 into the fix-use hole 407 of the base frame 403. Female threads is formed on an inner face of the fix-use hole 407, and the female threads formed on the inner face of the fix-use hole 407 corresponds to the male threads formed on the threaded portion 58a of the joint screw 585. As illustrated in FIGS. 14 and 15, a through hole 562 is formed for the heat sink 554 at a position corresponding to the link unit 580. The joint screw 585 can be fastened to the fix-use hole 407 by using a driver by inserting the driver from the through hole 562 formed on the heat sink 554.

When the joint screw 585 is fastened to the fix-use hole 407, one end of the pressing member 586 contacts the base frame 403 of the light guide unit 40, and then the helical compression spring 587 is pressed toward the base plate 512 by the pressing member 586. When the helical compression spring 587 is pressed by the pressing member 586, the helical compression spring 587 biases the base plate 512 to the Z2 direction. When the helical compression spring 587 presses the base plate 512 to the Z2 direction, the image display unit 50 is biased to a direction leaving from the light guide unit 40, which means the image display unit 50 is biased to a direction opposite to the light guide unit 40.

When the helical compression spring 587 biases the image display unit 50 to the Z2 direction, wobbling or rattling which may occur between the base plate 512 and the groove portion 585c of the joint screw 585 can be reduced, with which the link unit 580 can fix and support the image display unit 50 effectively.

Further, when the joint screw 585 is rotated and moved to the Z1 direction, a space between the image display unit 50 and the light guide unit 40 (i.e., space between the top plate 511 and the base frame 403 in the Z1-Z2 direction) becomes smaller. Further, when the joint screw 585 is rotated and moved to the Z2 direction, which is opposite the Z1 direction, the space between the image display unit 50 and the light guide unit 40 becomes greater.

In the above described configuration, by rotating the joint screw 585 to any directions, the link unit 580 can adjust a position of the image display unit 50 relative to the light guide unit 40. Therefore, by rotating the joint screw 585 while the image display unit 50 is being attached to the light guide unit 40, the position and inclination of the DMD 551 disposed on the image display unit 50 in the Z1-Z2 direction can be adjusted effectively.

As illustrated in FIGS. 10 and 11, three link units 580, each configured by the joint screw 585, the pressing member 586, and the helical compression spring 587, are disposed for the first unit 51. For the simplicity of description, three link units 580 are referred to as a first link unit 580a, a second link unit 580b, and a third link unit 580c. Similar to the link unit 580, the first link unit 580a supportingly fixes the first unit 51 to the base frame 403, and the space between the first unit 51 and the base frame 403 is adjustable by the first link unit 580a. The second link unit 580b supportingly fixes the first unit 51 to the base frame 403, and the space between the first unit 51 and the base frame 403 is adjustable by the second link unit 580b. The third link unit 580c supportingly fixes the first unit 51 to the base frame 403, and the space between the first unit 51 and the base frame 403 is adjustable by the third link unit 580c.

When the three link units 580 are disposed for the first unit 51, the space between the image display unit 50 and the light guide unit 40 can be adjusted by rotating the joint screw 585 of the three link units 580, with which the position and angle of the image generation plane 551a (see FIG. 16) of the DMD 551 relative to the light guide unit 40 and the projection unit 60 can be optimized. Therefore, the image display unit 50 can generate a projection image having a higher resolution level based on the shift movement of the DMD 551, and can display a higher quality image by optimizing the position of the DMD 551.

Further, the number and position of the link unit 580 disposed for the image display unit 50 is not limited to the above described number and position. The position of the DMD 551 can be changed or adjusted by disposing one or more link units 580 for the image display unit 50.

Figure 16:
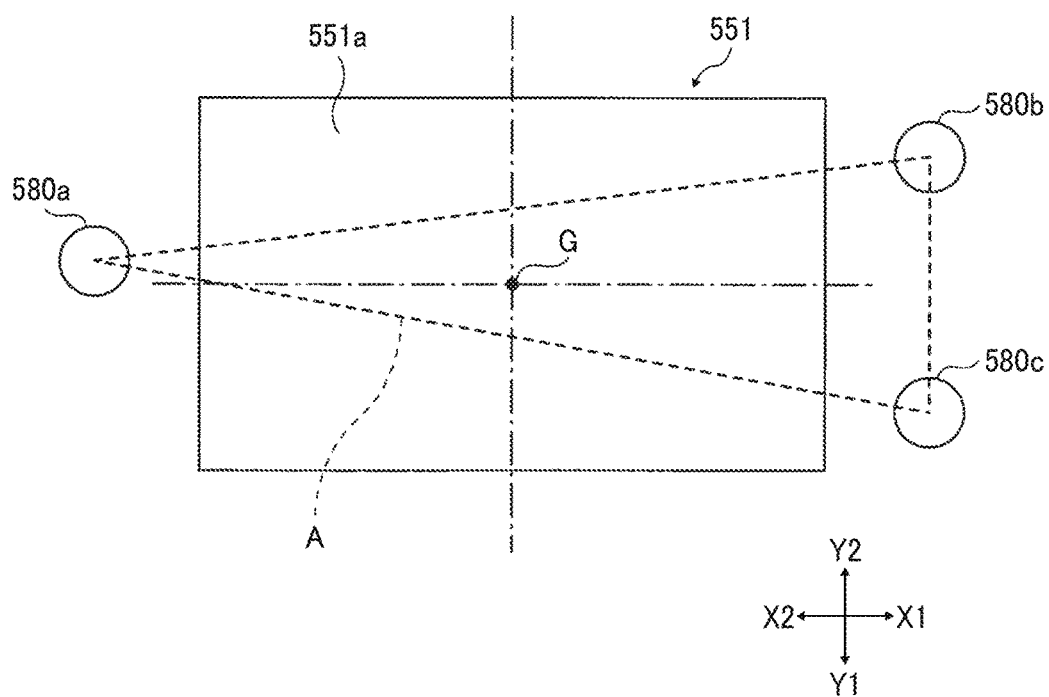
FIG. 16 illustrates a positional relationship of link units and a DMD of an embodiment.

Further, when the three link units 580 are disposed for the first unit 51, the three link units 580 are arranged with a pattern such that the center of gravity G of the image generation plane 551a is set inside an area A defined by virtual lines connecting the first link unit 580a, the second the link unit 80b, and the third link unit 580c when viewed from a direction perpendicular to the image generation plane 551a of the DMD 551 as illustrated in FIG. 16. In an example case of FIG. 16, the area A is a triangle area defined by the virtual lines connecting the first link unit 580a, the second link unit 580b, and the third link unit 580c. With this configuration, the image generation plane 551a of the DMD 551 can be tilted to any directions to adjust the angle of the image generation plane 551a of the DMD 551.

As to the above described image display unit 50 of the embodiment, the position and angle of the DMD 551 can be adjusted by the link unit 580 while the image display unit 50 is being attached to the light guide unit 40. Therefore, the position and angle of the DMD 551 relative to the light guide unit 40 and the projection unit 60 can be optimized, and an image having a higher resolution level and higher quality can be displayed.

As to the above described embodiments, the image display unit can display an image having higher resolution level and higher quality.

Numerous additional modifications and variations for the image display unit, image projection unit, and image projection apparatus are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. An image display apparatus, comprising:
   a first device fixed to a receiving frame;
   a second device, moveably supported by the first device, including an image generator to generate an image when light enters the image generator;
   a first link to supportingly fix the first device to the receiving frame, wherein a space between the first device and the receiving frame is adjustable by the first link,
   a second link to supportingly fix the first device to the receiving frame, wherein the space between the first device and the receiving frame is adjustable by the second link; and
   a third link to supportingly fix the first device to the receiving frame, wherein the space between the first device and the receiving frame is adjustable by the third link, and
   a center of gravity of an image generation plane of the image generator is set inside an area defined by virtual lines connecting the first link, the second link, and the third link when viewed from a direction perpendicular to the image generation plane of the image generator.

2. The image display unit of claim 1, wherein the first link includes a
   linking member to link the first device and the receiving frame when the first link supportingly fixes the first device to the receiving frame, the linking member being used to adjust the space between the first device and the receiving frame, and
   a bias member to bias the first device to a direction leaving from the receiving frame when the first link supportingly fixes the first unit to the receiving frame.

3. An image projection device, comprising:
   the image display apparatus of claim 1 fixed to the receiving frame; and
   a projector to project the image generated by the image generator included in the image display apparatus.

4. An image projection apparatus, comprising;
   the image projection device of claim 3; and
   a light source to emit light to the image generator included in the image display apparatus.

* * * * *